(12) United States Patent
Weik, III et al.

(10) Patent No.: US 6,484,784 B1
(45) Date of Patent: Nov. 26, 2002

(54) DOOR CONTROLLING DEVICE (76) Inventors: Martin Herman Weik, III, 2032 N. Taylor St., Arlington, VA (US) 22207; Arthur Stephen Weik, 3429 Woodburn Rd., Annandale, VA (US) 22003

(*) Notice: Subject to any disclaimer, the term of this patent is extended or adjusted under 35 U.S.C. 154(b) by 0 days.

(21) Appl. No.: 09/644,901

(22) Filed: Aug. 24, 2000

(51) Int. Cl.[7] ................................. E05F 15/20
(52) U.S. Cl. ..................... 160/7; 160/9; 49/7
(58) Field of Search ................ 160/1, 2, 7, 8, 160/9, 188, 133, 310, 291, 296; 49/1, 7

(56) References Cited

U.S. PATENT DOCUMENTS

| 1,617,440 A | | 2/1927 | Duncanson |
|---|---|---|---|
| 4,147,197 A | | 4/1979 | Bailey et al. |
| 4,785,293 A | | 11/1988 | Shearer et al. |
| 4,794,973 A | | 1/1989 | Perisic |
| 4,848,522 A | | 7/1989 | Wolf |
| 4,953,608 A | | 9/1990 | Larsson |
| 5,022,452 A | | 6/1991 | Burrell |
| 5,243,735 A | * | 9/1993 | Obrien, II |
| 5,245,879 A | | 9/1993 | McKeon |
| 5,270,629 A | * | 12/1993 | Hsieh |
| 5,332,021 A | * | 7/1994 | Todd et al. |
| 5,355,927 A | | 10/1994 | McKeon |
| 5,386,891 A | * | 2/1995 | Shea |
| 5,540,269 A | | 7/1996 | Plumer |
| 5,542,460 A | | 8/1996 | McKeon |
| 5,557,887 A | | 9/1996 | Fellows et al. |
| 5,576,581 A | * | 11/1996 | Iannuzzi et al. |
| 5,577,541 A | | 11/1996 | McKeon |
| 5,605,185 A | | 2/1997 | McKeon |
| 5,634,507 A | | 6/1997 | Kwoka |
| 5,673,514 A | | 10/1997 | McKeon |
| 5,706,875 A | | 1/1998 | Simon |
| 5,743,320 A | | 4/1998 | McKeon |
| 5,832,665 A | | 11/1998 | Miller et al. |
| 5,893,234 A | | 4/1999 | McKeon |
| 6,082,433 A | * | 7/2000 | Vafaie et al. |

FOREIGN PATENT DOCUMENTS

| DE | 40 32 977 A | 10/1991 |
|---|---|---|
| EP | 0 881 349 A | 12/1998 |
| EP | 0 959 222 A | 11/1999 |

* cited by examiner

Primary Examiner—Blair M. Johnson
(74) Attorney, Agent, or Firm—Birch, Stewart, Kolasch & Birch, LLP (57) ABSTRACT

A door, such as a fire door or a security gate, for blocking a throughway or opening in an exterior or interior wall of a building, such as a doorway or countertop window, has an open position and a closed position. A force, such as gravity, a counter weight or a spring, tends to move the door toward its closed position. In the case of the fire door, a disengageable stop holds the door in its open position. The disengageable stop includes a brake actuator for releasing a brake. An expandable linkage, having a normal length and having an elongate length when an external force is applied thereto, has a first end connected to the brake actuator. A second end of the expandable linkage is connected to a fire condition sensitive device, which releases the second end upon a fire indicative condition. With the fire door, or any other type of door, a DC generator is connected to the door and produces power as the door moves from its open position to its closed position. A DC motor is also connected to the door and has an ability to move the door from its closed position to its open position. A first power terminal is connected to the motor, and adapted to receive a second terminal of a portable, rechargeable DC battery.

39 Claims, 6 Drawing Sheets

DOOR CONTROLLING DEVICE

BACKGROUND OF THE INVENTION

1. Field of the Invention

The present invention relates to a control device for closing and opening a door. More particularly, the present invention relates to mechanisms for facilitating various control operations of a door.

2. Description of the Relevant Art

Doors which close in response to a predetermined condition, such fire doors, are well known in the background art. A fire door serves as a barrier to the spread of fire, smoke or fumes through an opening or throughway in a building interior or exterior wall. Fire doors can be stored in a ceiling, wall or floor of a building, and close downwardly, sidewardly, or upwardly, respectively, to close the throughway automatically upon a sensed condition, such as excessive heat or smoke.

A rolling fire door is usually constructed of a plurality of interconnected fire-resistant slats, which are rolled up and stored on a rotating pipe over, under, or next to a throughway. Fire doors may also be of other designs. For example, a fire door could be a solid section or a combination of solid and rolling sections. Rolling overhead fire doors and other configurations can weigh from as little as a few hundred pounds to more than a thousand pounds.

Some fire doors are designed to sit open, ever vigilant for a detected fire condition. Other fire doors are operated (e.g., opened and closed) often for security and environmental reasons. These other fire doors are usually motorized, or have a manual chain hoist, in order to facilitate the opening and closing of the fire door. Most all fire doors have one or more fire links that will allow the fire door to close when excessive heat is detected. Some fire doors are also connected to smoke detector systems and alarms, so that the fire door is closed in response to excessive smoke or a fire alarm.

Rolling fire doors typically come in four types: manual push up; manual chain hoist; electric motor operated, non-automatically resetting; and electric motor operated, automatically resetting. Each type has inherent drawbacks associated with its design. The first three types are older designs, and have similar drawbacks. The fourth type is a newer design with different drawbacks, and therefore will be discussed separately.

Because a fire condition is often accompanied by a loss of electrical power, fire doors typically rely on gravity for closing, except in the case of a lightweight door, where a spring may provide a supplemental force to assist the door in closing. Side-closing, up-closing, and flat-closing fire doors also rely on springs to provide a force in the closing direction of the fire door.

Various mechanisms have been employed to slow and control the closing rate of a fire door, such as friction brakes, counter wound torsion springs, ratcheting systems and even a hydraulic resistance system (see U.S. Pat. No. 5,002,452). It is important to control the closing rate, since fire doors are mandated to drop at a rate of six to twenty-four inches per second, by fire codes.

The electric motorized types and the manual chain hoist type of fire door have a mechanism, usually a gear, held in place by a frangible fire link chain. The gear drops out of the motor gearing or chain hoist (e.g., when excessive heat is detected), so that the fire door can close independent of the motor and raising/lower mechanism. To test these types of fire doors, it is necessary to disconnect the fire link chain, so that the gear drops out.

A qualified door mechanic must reset the mechanism after a door is deployed in response to a fire condition or tested. Access to the mechanism is often limited, when the mechanism is buried in the ceiling, amid ducts, wires, and pipes. Therefore, testing and resetting of fire doors can be a costly endeavor. Fire codes require an annual testing of the fire doors. Further, many industrial plants require a monthly testing to meet the conditions of their insurance policies. The required testing is not only expensive, but also time consuming to oversee, manage, and reset the fire doors.

An additional disadvantage is that these mechanisms are prone to failure in many ways. For example, the fire door may not drop at all, resulting in major losses for insurance companies when a fire occurs. As another example, these mechanisms often do not accurately control the drop rate of the fire door, causing the fire door to crash into the floor, resulting in damage to the door, and a safety risk to anyone unlucky enough to be under the fire door when it drops. Repairing the damaged door adds to the expense associated with fire door testing, and adds to the down time associated with repairing and resetting the fire door.

The electric motor operated, automatically resetting type of fire door can be tested without disconnecting the fire link chain. This type of fire door relies on a centrifugal brake. This type of fire door has no overrun control, and, in fact, the motor acts like a flywheel, increasing the overrun. The motor can freewheel at 1800 RPM, and cause damage to the top slats of the fire door, especially on smaller doors, after only a few test drops. Additionally, there is no control on the drop speed of the fire door, other than the rate of close control, determined by the centrifugal brake, since the unit is designed to work in a no power condition.

In the electric motor operated, automatically resetting type of fire door, power must be constantly provided to the motor control mechanism in order to hold the fire door open. If power is lost to the motor control mechanism, the fire door will automatically close, even if the power outage is brief, such as during an electrical storm. If the power remains off, this type of fire door cannot be reopened for emergency personnel or emergency egress. One attempt to overcome these drawbacks has been to include an expensive battery backup system for the motor control mechanism.

Another drawback of the electric motor operated types of fire doors is the requirement of a constant source of AC power. AC power lines must be ran to each fire door. This is an expensive installation. For example, in a warehouse, where a 277 volt lighting system is the only power used, the cost of running additional high capacity power lines to the fire door controllers can exceed the cost of the actual fire doors themselves. The alternatives to these motor operated types of fire doors are the manual types of fire doors (the first and second types, above), which are difficult to test and reset, as noted above.

Both electric motor operated types of fire doors (the third and fourth types) are driven down or closed by the electric motor. Since these door controllers are designed to raise the fire doors, often when the springs are unwound, the motors have sufficient torque to cause damage to, or destroy, the door slats, if the door slats become jammed or cannot travel freely to the closed position. Often the motors will run to their bottom limit with the fire door still in the open position, while twisting, jamming, and ripping the slats in the process. This condition is also possible with other types of rolling doors, such as security grills, etc.

In summary, a general drawback of the background art's fire doors is that the typical fire door, once it closes, is difficult or impossible to open for emergency egress or to allow emergency personnel or equipment to enter. The electric types can be reopened, but only if power is still available, which is not always the case. If firemen cut a hole through the fire door to gain access, and the fire overruns their position, integrity is lost since the fire door is not and cannot be fully closed. Mechanical types of fire doors are prone to failure, and testing and resetting of the fire door is a costly operation because of the complexity of the mechanism, and the hindrance in gaining access to the operating mechanism. Electrical types of fire doors are easier to reset, but the installation of the equipment is expensive; continuous AC power is needed to keep the door open (or an expensive battery backup system); the drop rate control under a no-power situation is likely to result in damage to the door or persons in the vicinity; when powered down or closed, if the fire door does not run smoothly, the motor torque will do damage to the door slats; and once dropped, the fire doors cannot be easily reopened for egress or emergency personnel.

SUMMARY OF THE INVENTION

The present invention has as a primary object to improve on the mechanisms of the background art or to solve one or more of the drawbacks associated with the mechanisms of the background art.

It is an object of the present invention to provide a heat or smoke actuated device, including a fire link, for actuating a fire door, wherein the device can be tested without breaking or disconnecting the fire link, and wherein every closing of the fire door constitutes a testing of the device.

It is a further object of the present invention to provide an improved control and operating system for any type of automatically closing door, which can be opened, closed, tested, reset and controlled without the provision of any hard-wired power source.

It is an even further object of the present invention to provide a device, which harnesses energy generated by a closing door to control the closing of the door.

Moreover, it is an object of the present invention to provide a device, which harnesses energy generated by a closing door to power auxiliary operations.

Moreover, it is an object of the present invention to provide an improved device for controlling the closing speed of a door.

Moreover, it is an object of the present invention to improve the resetting characteristics of a powerless door.

Moreover, it is an object of the present invention to improve the operational characteristics of any motor operated door.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
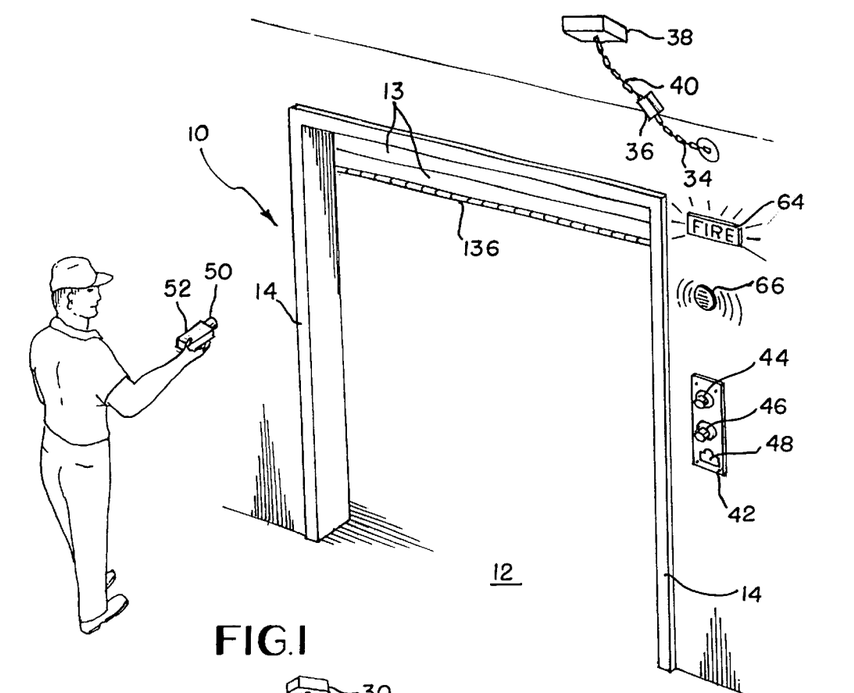
FIG. 1 is a perspective view of one side of a drop-type fire door, in accordance with the present invention.
Figure 2:
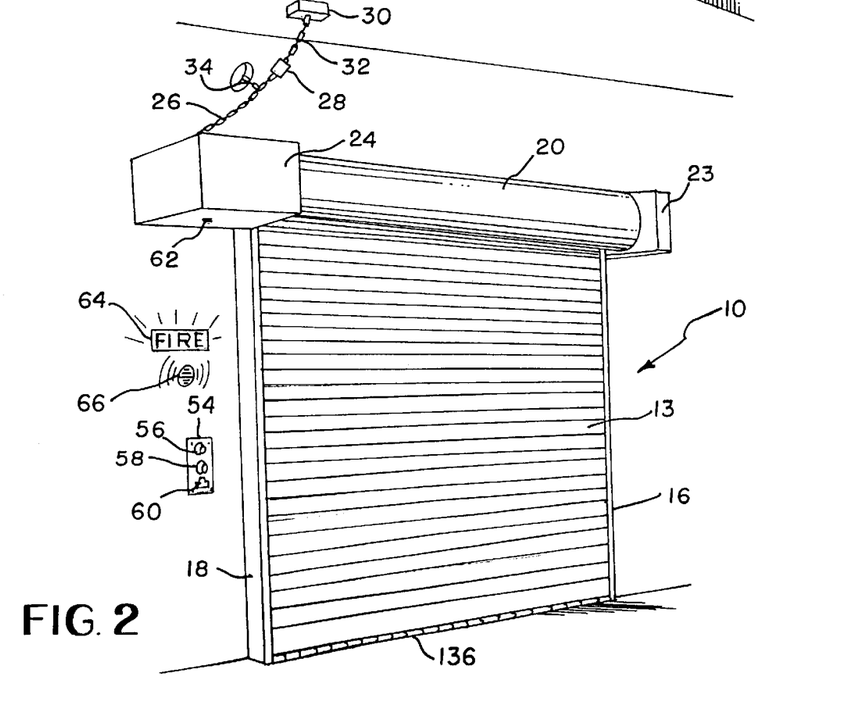
FIG. 2 is a perspective view of the other side of the fire door of FIG. 1.

FIGS. 1 and 2 illustrate a fire door 10, in accordance with the present invention. FIG. 1 illustrates the fire door 10 in an open, first position, whereas FIG. 2 illustrates the fire door 10 in a closed, second position.

Now, the features of the fire door 10 which are commonly employed in the background art will be briefly described. The fire door 10 is provided to selectively block a throughway 12 defined inside a frame 14. Although the throughway 12 is illustrated, as being at grade level, so that a person or vehicle could pass therethrough, the throughway 12 could also be an external window, countertop window, or any opening to be selectively blocked by the fire door 10. Moreover, although a fire door 10 is shown and discussed, and present invention is equally applicable to any type of door, such as an open grated, security grill which closes a customer counter, a hurricane shutter for a window, a garage door, etc. Therefore, in the claims, the term "door" is intended to be broadly construed to include a broad range of structures which move in order to restrict or limit access or view through an opening, passageway, hole, or other similar location.

The fire door 10 is formed of a plurality of interconnected slats 13, which are guided for vertical travel by right and left guide rails 16, 18. When the fire door is in the open position, the slats 13 are rolled up onto an elongated shaft 22 (see FIGS. 3–5) and located inside a cover 20.

On the right end of the cover 20 there is provided an optional spring box 23. The spring box 23 includes an assist spring (not shown), which is keyed to the elongated shaft 22. The assist spring can store potential energy as the fire door 10 is closed and give up the potential energy as the fire door 10 is opened, in order to assist an operator in opening the fire door 10. Alternatively, the assist spring can store potential energy as the fire door is opened and give up the potential energy as the fire door 10 is closed, in order to assist the forces of gravity in closing the fire door 10. Although the spring is described as being located on a side of the elongated shaft 22, the spring could be inside of a hollow elongated shaft 22, thereby eliminating the physical presence of the spring box 23.

On the left end of the cover 20 there is provided a mechanical drive box 24. A first chain 26 extends from a top of the mechanical drive box 24. The first chain 26 is connected under tension to a first fire link 28. The first fire link 28 is connected under tension to a first ceiling fixture 30 via a second chain 32. A third chain 34 is also connected to the first fire link 28 and passes through the wall. On the other side of the wall, the third chain 34 is attached to a second fire link 36. The second fire link 36 is attached to a second ceiling fixture 38 under tension via a fourth chain 40.

The purpose of the first and second ceiling fixtures 30, 38 and the first and second fire links 28, 36 is to sense a condition indicating a fire and to provide slack to the first chain 26 entering the mechanical drive box 24, upon the occurrence of a fire condition. For example, excessive heat, on the side of the door illustrated in FIG. 2, will melt the first fire link 28 and allow the first chain 26 to slack and partially pass into the mechanical drive box 24. Excessive smoke, on the side of the fire door 10 illustrated in FIG. 2, or a general fire alarm, will cause the first ceiling fixture 30 to release the second chain 32, thereby creating slack in the first chain 26 and allowing the first chain 26 to partially enter the mechanical drive box 24. The details of such fire condition sensors can be found in the background art, such as U.S. Pat. No. 4,147,197.

Now, the structures of FIGS. 1 and 2, which concern the present invention will be described. A first control panel 42 is mounted on a wall adjacent to the fire door 10. The first control panel 42 includes a first switch 44 for resetting/opening the fire door 10, a second switch 46 for testing/closing the fire door 10, and a first socket or electrical terminal 48 for receiving a second terminal 50 of a rechargeable battery 52. A second control panel 54, having a third switch 56, a fourth switch 58, and a third electrical terminal 60 is provided adjacent the fire door 10 on the other side of the wall, and has the same functions, respectively. To reduce costs, it would be possible to eliminate one of the first or second control panels 42, 54, while retaining many of the benefits of the present invention.

A manual release handle 62 depends from a lower surface of the mechanical drive box 24. Pulling the manual release handle 62 will result in a testing/closing of the fire door 10. Optional visual indicators 64 are mounted on the walls adjacent to the fire door 10. The visual indicators 64 light up, or strobe, when the door is tested/closed. The visual indicators 64 may include indicia, such as "fire", "closing", "caution", etc. Also, optional audible indicators 66 are mounted on the walls adjacent to the fire door 10. The audible indicators 66 beep, alarm, or play a recorded announcement, when the door is tested/closed.

Figure 3:
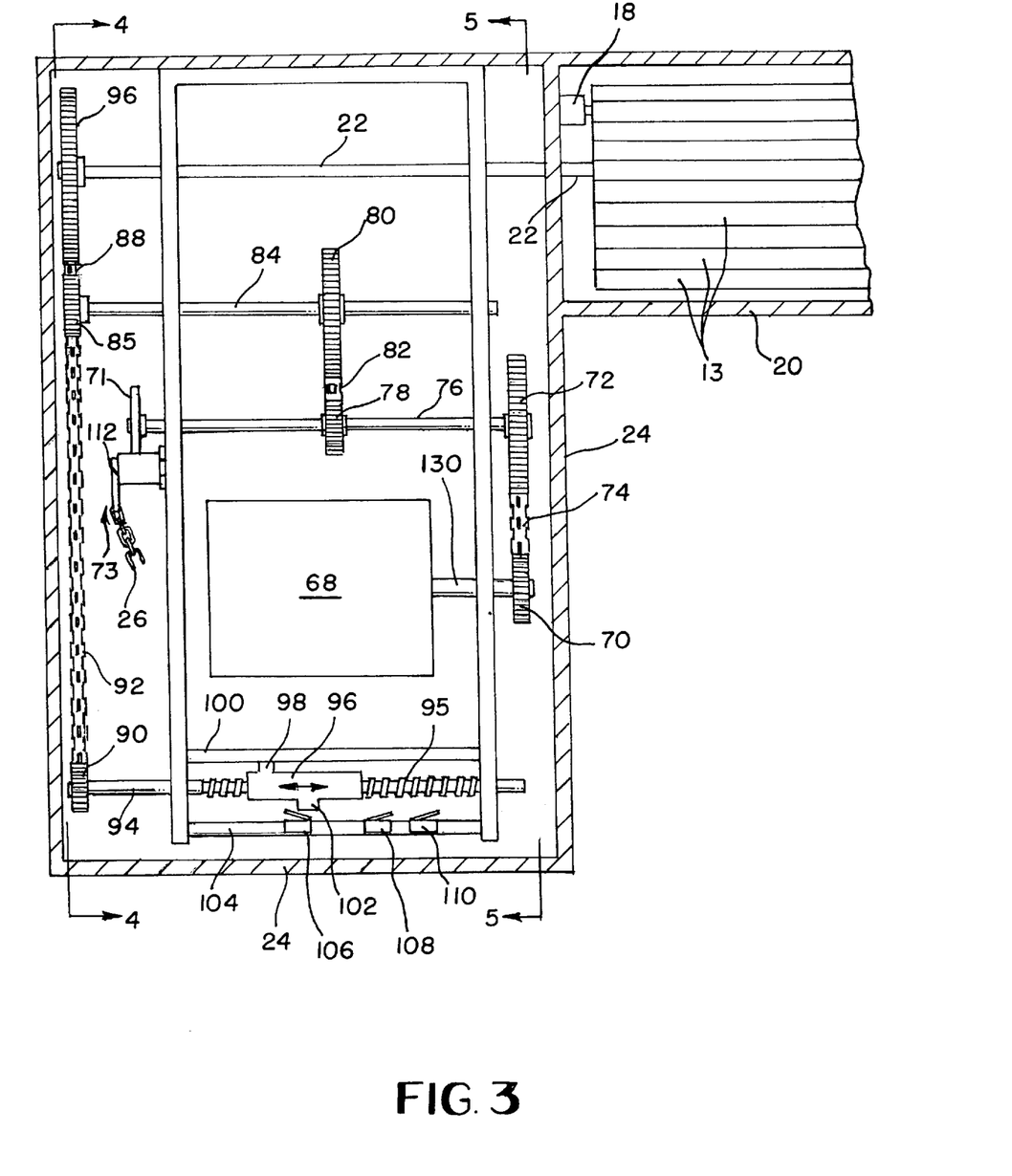
FIG. 3 is a cross sectional, overhead view of the drive mechanism of the fire door.
Figure 4:
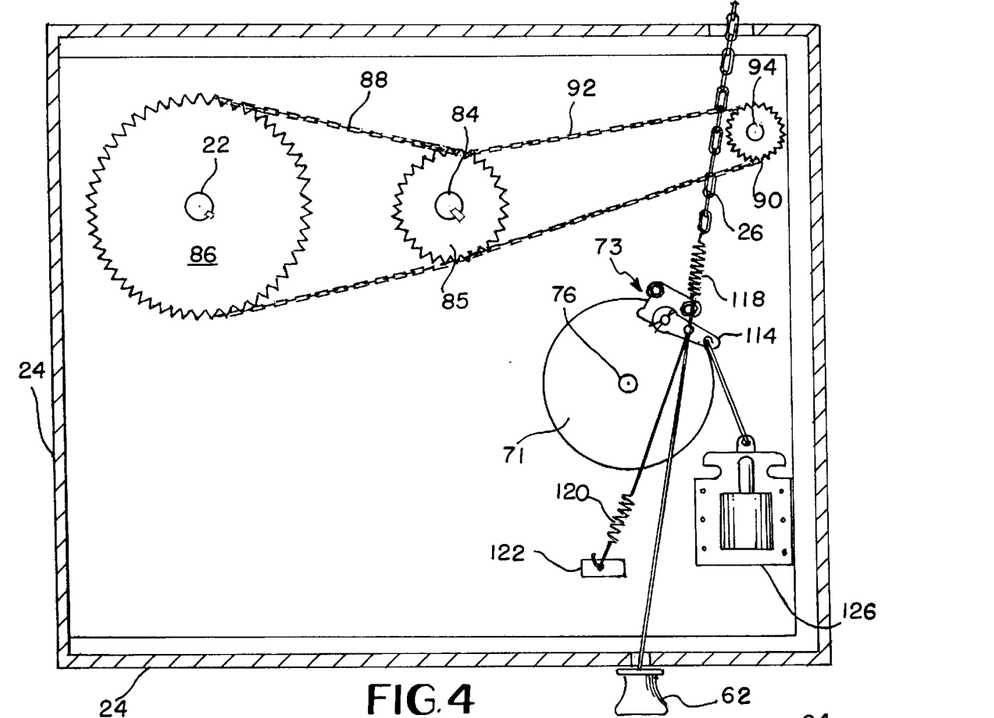
FIG. 4 is a cross sectional view taken along line 4—4 in FIG. 3.
Figure 5:
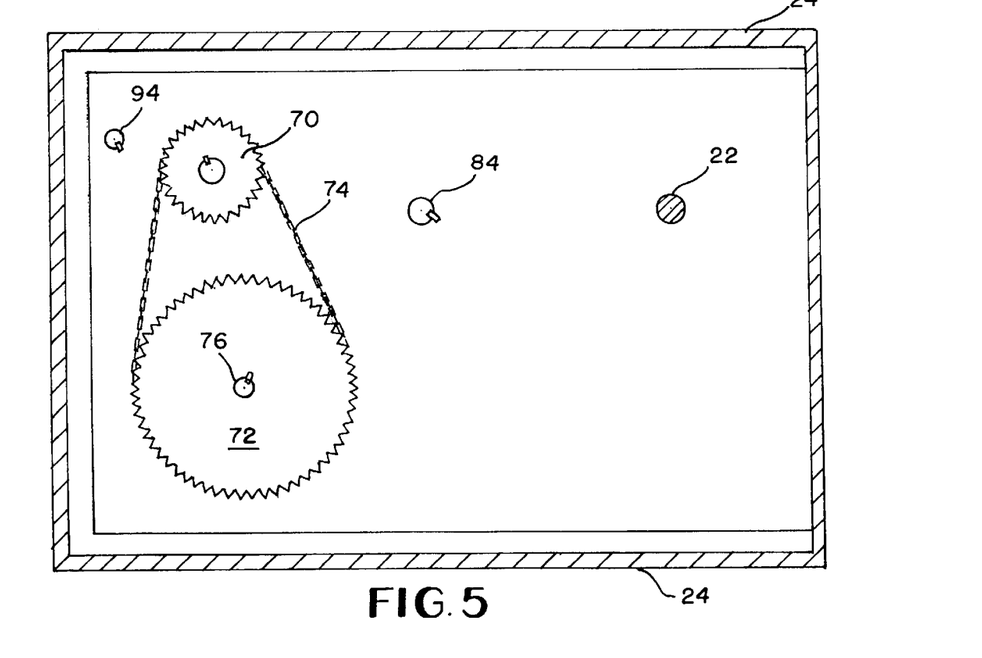
FIG. 5 is a cross sectional view taken along line 5—5 of FIG. 3.

Now, with reference to FIGS. 3–5, the components of the mechanical drive box 24 will be disclosed. A DC powered motor/generator 68 is contained therein. The motor/generator 68 rotates a first gear 70, via a rotor 130. The first gear 70 drives a second gear 72, via a first chain 74. The relative sizes of the first gear 70 and the second gear 72 result in a speed reduction.

The second gear 72 is attached to and rotates in unison with a first shaft 76. A brake disk 71 of a disengageable stop or brake system 73 is attached to and rotates in unison with the first shaft 76. A third gear 78 is also attached to and rotates in unison with the first shaft 76. The third gear 78 drives a fourth gear 80, via a second chain 82. The relative sizes of the third gear 78 and the fourth gear 80 result in a further speed reduction.

The fourth gear 80 is attached to and rotates in unison with a second shaft 84. A fifth gear 85 is attached to and rotates in unison with the second shaft 84. The fifth gear 85 drives a sixth gear 86, via a third chain 88. The relative sizes of the fifth gear 85 and the sixth gear 86 result in a further speed reduction. The fifth gear 85 also drives a seventh gear 90 via a fourth chain 92.

The sixth gear 86 is attached to and rotates in unison with the elongated shaft 22. The interconnect slats 13 of the fire door 10 are wound or unwound about the elongated shaft 22, as discussed above.

The seventh gear 90 is attached to and rotates in unison with a third shaft 94. The third shaft 94 includes surface threading 95 along a central portion thereof A sleeve 96, having internal threading, encircles the surface threading 95 of the third shaft 94. The sleeve 96 includes a tab 98 fixed to an outer surface thereof The tab 98 is captured inside of a slot extending along a guide 100. The slot prevents the sleeve 96 from rotating in unison with the third shaft 94. Due to the engagement of the surface threading 95 of the third shaft 94 and the internal threading of the sleeve 96, the sleeve 96 will move longitudinally along the third shaft 94, as the tab 98 slides longitudinally within the slot of the guide 100.

The sleeve 96 also includes a lobe 102 fixed to its outer surface. The lobe 102 travels longitudinally along with the sleeve 96. A support 104 extends alongside the third shaft 94. The support 104 includes mounting features, such as pilot holes, so that limit switches can be mounted on the support 104 at desired locations, in order to be tripped by the lobe 102 when the fire door 10 is at a certain stage of being opened or closed. FIG. 3 illustrates a first limit switch 106, a second limit switch 108, and a third limit switch 110 mounted on the support 104.

In the present embodiment, the first limit switch 106 is a double pole switch, wherein both poles are normally closed. When the lobe 102 contacts the first limit switch 106, both poles of the first limit switch 106 are opened. The second limit switch 108 is a single pole switch which is normally open. When the lobe 102 contacts the second limit switch 108, the second limit switch 108 is closed. The third limit switch 110 is a single pole switch which is normally closed. When the lobe 102 contacts the third limit switch 110, the third limit switch 110 is opened.

Figure 6:
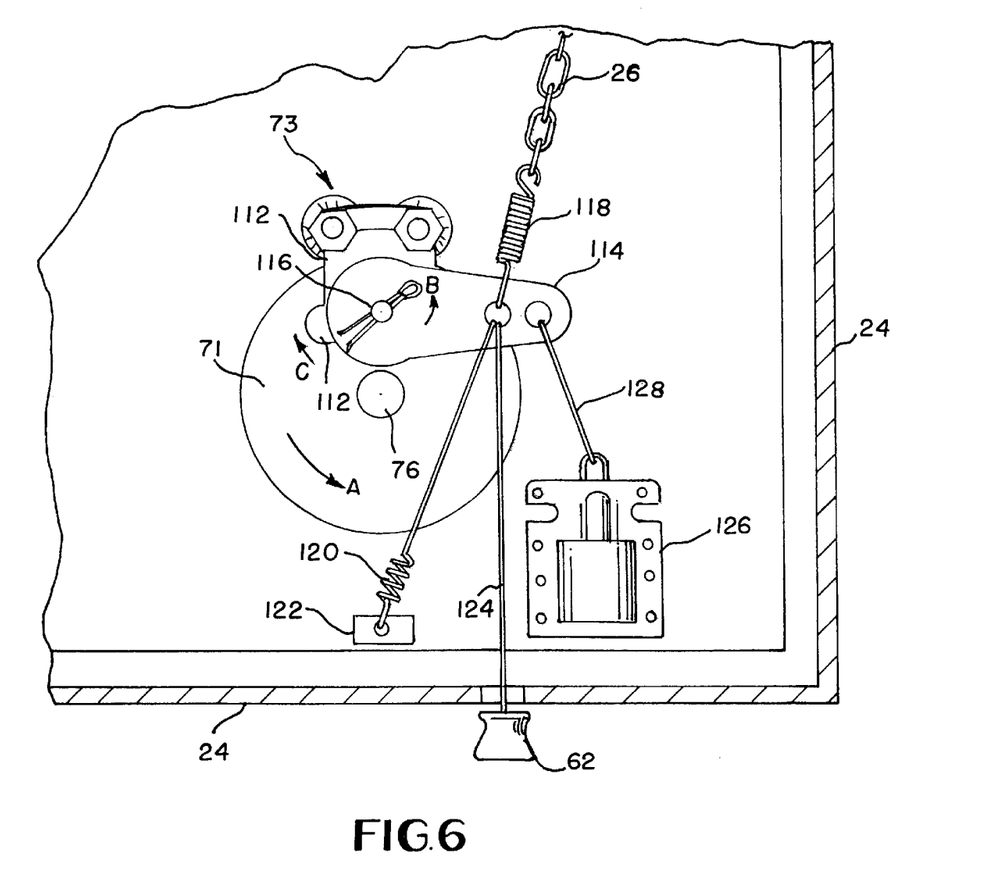
FIG. 6 is a close-up view of drop actuator mechanism of FIGS. 3 and 4.

FIG. 6 is a close-up view of the disengageable stop or brake system 71 illustrated in FIG. 4. The brake system 71 is responsible for asserting movement of the door, such as in the open position. If not for the brake system 71, the weight of an open door would tend to rotate the brake disk 71 in the direction of the arrow A. In fact, the weight of the open door would ultimately rotate the rotor 130 of the motor/generator 68, via the interconnected gears, chains and shafts, as the open door progressed to its closed position.

The brake system 71 includes calipers 112 having brake pads for engaging the brake disk 71. A brake actuator, such as a lever 114 is rotateable about a pivot point 116.

The lever 114 is biased in the direction of arrow B, and normally applies a force in the direction of arrow C to keep the calipers 112 in friction contact with the brake disk 71, and thus prevent rotation of the brake disk 71. The lever 114 is biased in the direction B by a first spring 118 which is attached to the first chain 26, recalling that the first chain 26 is under tension as it enters the mechanical box 24. The first spring 118 and first chain 26 constitute one embodiment of an expandable linkage.

Should a fire condition be sensed, slack is provided to the first chain 26, and the lever 114 will pivot in a direction opposite to arrow B. The lever 114 will pivot due to its own weight, or, in a preferred embodiment, with the assistance of a second spring 120 attached to a fixed support 122. When the lever 114 pivots in the direction opposite to arrow B, the calipers 112 will release the brake disk 71, and the fire door 10 is free to move to the closed position under its own weight.

As a further explanation, the spring constant of the second spring 120 is less than the spring constant of the first spring 118. By this arrangement, the lever 114, normally resides in the position activating the calipers 112, and thus holding the brake disk 71. When the first chain 26 is slackened, indicating a fire condition, the second spring 120 moves the lever 114 to a release position, so that the fire door 10 will close.

If an operator wishes to manual test the fire door, the operator need only pull down and hold the manual release handle 62. The manual release handle 62 is connected to the lever 114, via a link 124. If the manual release handle 62 is pulled, the force transmitted via the link 124 will supplement the spring constant of the second spring 120 so as to overcome the spring constant of the first spring 118. Therefore, it can be seen that the lever 114 can be moved in the release direction, opposite to the arrow B, without having slack provided in the first chain 26. This is particularly advantageous in that the fire door 10 can be tested without breaking or disconnecting any of the chains, fire links, or smoke detector releases above the fire door (as illustrated in FIGS. 1 and 2).

A solenoid 126 is also connected to the lever 114 via a linkage 128. When the solenoid 126 is activated, the solenoid 126 will pull the linkage 128. The combination of the force applied by the solenoid 126 and the spring constant of the second spring 120 is sufficient to overcome the spring constant of the first spring 118, and allow the brake disk 71 to be released. The solenoid 126 is considered to be the primary and usual device for testing/closing the fire door 10. The manual release handle 62 is considered to be a backup/emergency manner of testing/closing the fire door 10. The operation of the solenoid 126 will be discussed further with reference to the electrical schematic of FIG. 7.

Now, with reference to the electrical schematic of FIG. 7, several new and improved operations made possible by the present invention will be described.

I. Testing/Closing the Fire Door

First, a situation wherein the fire door 10 is in its open position, and an operator wishes to test or close the fire door 10, will be described. The operator inserts the second electrical terminals 50 of the rechargeable battery 52 into the first electrical terminal 48 of the first control panel 42. Next, the operator presses the second switch 46. Typically, the second switch 46 would be labeled "test/close", or some other similar wording.

The second switch 46 is a double pole switch, with both poles being normally open. So long as the fire door 10 has not yet reached its closed position (i.e., the third limit switch 110 remains closed), pressing the second switch 46 energizes the solenoid 126. When the solenoid 126 is energized, the linkage 128 applies a force to the lever 114, so as to supplement the spring constant of the second spring 120 and overcome the spring constant of the first spring 118. Therefore, the lever 114 is moved, and the calipers 112 release the brake disk 71.

When the brake disk 71 is free to rotate, the weight of the fire door 10 will cause the fire door 10 to move toward its closed position. Just as the fire door 10 reaches its closed position, the third limit switch 110 is contacted by the lobe 102. When the third limit switch 110 is contacted by the lobe 102, its normally-closed single pole is opened. When the pole is opened, power is cut to the solenoid 126, even if the operator continues to press the second switch 46.

When power is cut to the solenoid 126, the spring constant of the first spring 118 overcomes the spring constant of the second spring 120 and the lever 114 moves to a position causing the calipers 112 to engage the brake disk 71. Therefore, at the approximate time the fire door 10 contacts the floor (or under other circumstances, when the fire shutter contacts the countertop), the brake system 73 is engaged. This is an important advantage since momentum is built up, as the fire door 10 closes, and such momentum can overrun the mechanisms associated with deploying the fire door 10, as discussed in connection with the background art above. Therefore, the third limit switch 108 acts to prevent over-running of the fire door 10 in the closing direction.

It is also possible to test/close the fire door 10 even if the operator does not have a rechargeable battery 52 in his possession. The operator can simply pull and hold the release handle 62, as discussed above.

II. Harnessing of Energy Created by the Closing Fire Door

As the fire door 10 travels from its open position to its closed position, the chains, gears, and shafts are driven to rotate. Ultimately, the rotor 130 of the motor/generator 68 is driven to rotate, as the fire door 10 moves to its closed position. Rotation of the rotor 130 of the motor/generator 68 causes a generator function of the motor/generator 68 to produce power. Such a motor/generator 68 can be purchased commercially, such as a Dayton DC motor, model # 4Z529.

The produced power is used to activate the visual indicators 64 and audible indicators 66. Further, the produced power is fed back to a motor function of the motor/generator 68, in such a manner as to cause the motor function of the motor/generator 68 to resist the rotation of the rotor 130. Such an arrangement is commonly referred to as regenerative braking.

A variable resistor 132 is optionally placed in series with the indicators 64, 66. The variable resistor 132 is useful in the initial balancing and setting up of the present invention, so as to match the regenerative braking forces produced to the dynamics of a particular fire door 10. For example, setting the variable resistor 132 to a relative high resistance will reduce the power fed back to the motor function of the motor/generator 68, and hence will reduce the regenerative braking. Therefore, the installer would set the variable resistor 132 relatively high when setting up the door control system of the present invention in combination with a relatively light weigh door, such as a countertop shutter conventionally found at the parts counter of an automotive dealer.

Of course, a variable resistor 132 is not required to practice the broad teachings of the present invention. It would be possible to install a fixed resistor at the job site, or to rely completely on the inherent resistances of the visual and audible indicators 64, 66.

Additional optional accessories 134 can also be powered by the generator function of the motor/generator 68, as the door closes. For example, a capacitor bank could be installed as the optional accessory 134. The capacitor bank would store power as the fire door 10 closes. The capacitor bank would then continue powering the visual and/or audible indicators 64, 66 after the fire door 10 has closed. For example, the visual indicator 64 could remain lit for several minutes after the fire door 10 is closed, so as to provide lighting and directional indications to any occupants inside the building, even if the building's main AC power were out.

As another example, the optional accessories 134 could be a pager transmitter, which activates a pager carried by the building manager or security personnel. The pager's activation would serve as an alert that the particular fire door had been deployed. Also, the power generated could be feed to other solenoids 126 of other fire doors 10. Such a daisy-chain arrangement would result in all of the daisy-chained fire doors 10 closing upon the closing of any one of the fire doors 10.

There are limitless advantageous uses for the power produced by the closing fire door 10. Such power is particularly advantageous in that no outside source of AC power need be operative, or even provided, in the vicinity of the fire door 10. Yet, when the fire door 10 is tested/closed, or activated in the event of a fire, power will be present to provide lighting, alarms, instructions, etc. Therefore, a great cost savings is had since the expense of electrical wiring, ran to each and every fire door, is not required. Moreover, even if wiring were present, during a fire, power is often lost. The present invention harnesses the power transmitted from the generator function of the motor/generator 68 to power the alarms, etc. Therefore, even if power is lost, the alarm features will continue to function.

III. Creep Mode

Figure 8:
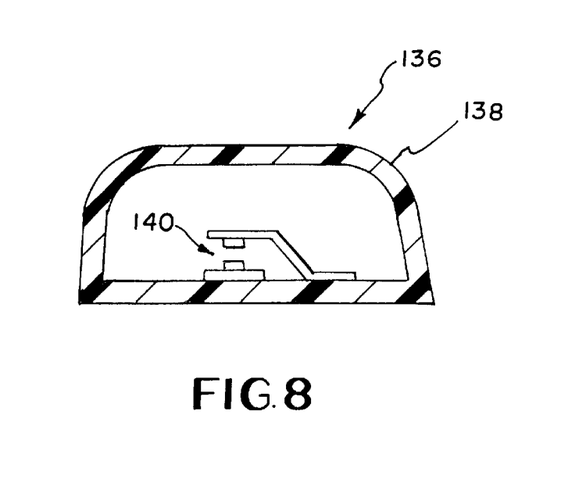
FIG. 8 is a cross sectional view of a sensor strip attached to a leading edge of the fire door.

As illustrated in FIGS. 1 and 2, a sensor strip 136 is proved on a leading edge of the fire door 10. FIG. 8 is a cross sectional view of the sensor strip 136. Essentially, a flexible membrane 138 encloses an elongated contact switch 140, or a plurality of contact switches 140. Pressure on the leading edge of the fire door 10 causes the contact switch 140 to close.

Figure 7:
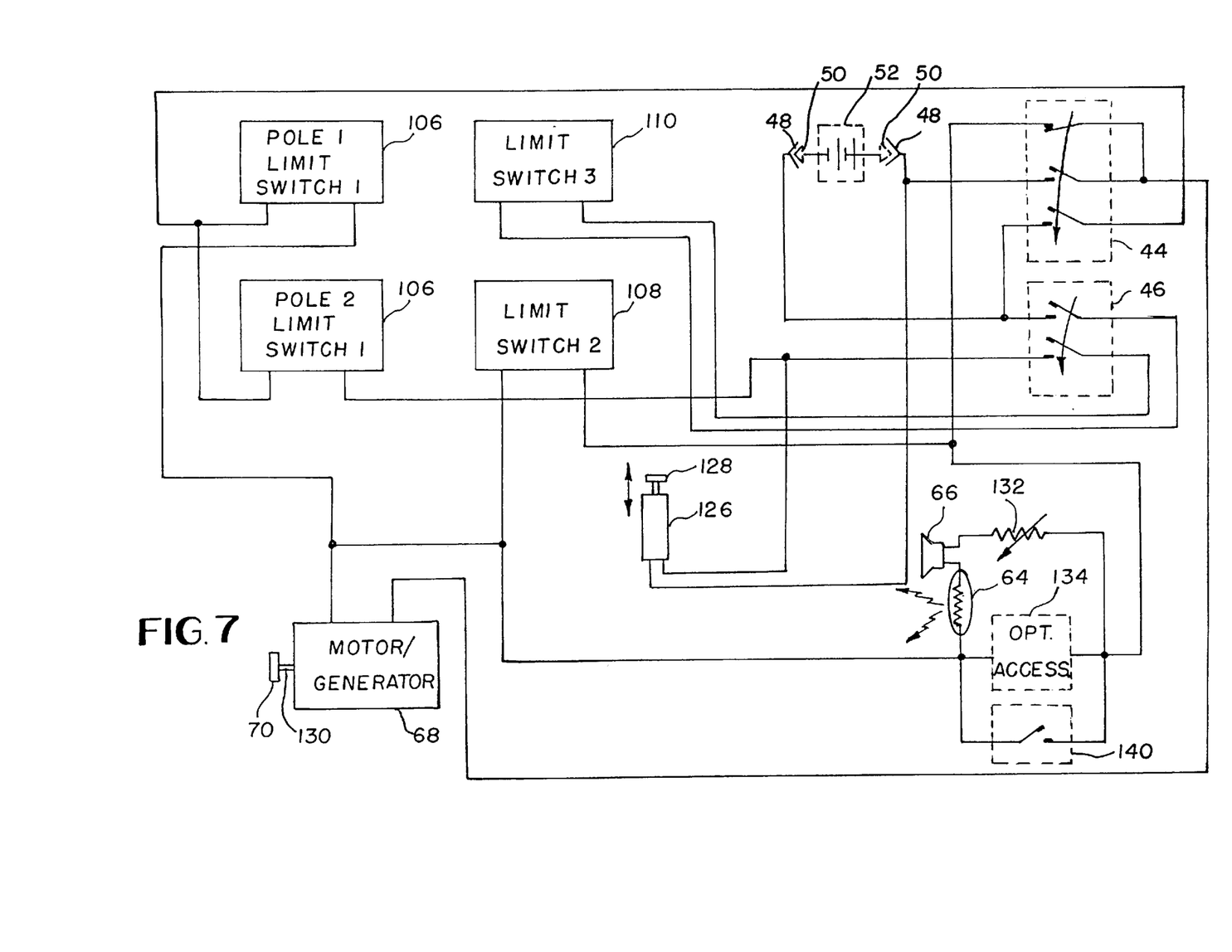
FIG. 7 is an electrical schematic of a control system for the fire door.

As illustrated in FIG. 7, the contact switch 140 is placed in parallel to one or more of the visual and audible indicators 64, 66, any optional accessories 134 and any variable resistor 132. Closing of the contact switch 140 will provide a short circuit of the power produced by the generator function of the motor/generator 68 directly to the motor function of the motor/generator 68. Therefore, more power is fed back, and the closing speed of the fire door 10 is reduced.

As an example of the use of the creep mode, if a person exiting past a closing fire door 10 wishes to slow the decent rate of the fire door 10 that person need only press against the leading edge of the fire door 10. This would be a natural reaction of a person attempting to slow the fire door 10, i.e., push up against the door. A person might wish to slow the door's decent rate if he/she saw another person racing toward the closing fire door 10 in an attempt to exit because of a fire condition inside the building.

Of course other types of switches or sensors could be substituted for the contact switch 140. For example, the flexible membrane 138 could be fluid-filled and a pressure sensitive switch could then sense increased fluid pressure caused by contact occurring at any point along the sensor strip 136. As another example, the power produced by the generator function of the motor/generator 68 can be used to power an infrared beam or electric eye provided across the threshold of the throughway 12 or along the leading edge of fire door 10. Any detected obstacle in the path of the closing fire door 10 will automatically place the fire door 10 into the creep mode.

The creep mode also plays a role in preventing overrun damage, as discussed in section I., above. Just before the fire door's leading edge contacts the floor, countertop, wall, or other relevant structure, the second limit switch 108 is contacted by the lobe 102. The second limit switch 108 is normally open, however contact by the lobe 102 causes the second limit switch 108 to close. Closing the second limit switch 110 presents a short circuit of the power produced by the generator function of the motor/generator 68 directly to the motor function of the motor/generator 68. Therefore, more power is fed back, and the closing speed of the door is reduced just before the fire door 10 is completely closed. By so doing, the activation of the braking system 73 when the fire door 10 is completely closed, as discussed in section I above, is more effective.

IV. Resetting/Opening the Fire Door

When an operator wishes to open/reset the fire door 10, the operator inserts the second electrical terminals 50 of the rechargeable battery 52 into the first electrical terminal 48 of the first control panel 42. Next, the operator presses the first switch 44. Typically, the first switch 44 would be labeled "reset/open", or some other similar wording.

The first switch 44 is a triple pole switch, with one pole being normally closed and two poles being normally open. So long as the fire door 10 has not yet reached its fully open position (i.e., the pole 1 of the first limit switch 106 remains closed), pressing the first switch 44 connects the rechargeable battery 52 to the motor function of the motor/generator 68. When the battery 52 energizes the motor/generator 68, the rotor 130 is rotated and via the speed reductions of the many interlinked chains, gears, and shafts, causes the slats 13 of the fire door 10 to be rolled up onto the elongated shaft 22.

As the fire door 10 reaches its open position, the lobe 102 contacts the first limit switch 106. The first limit switch 106 includes two poles, both of which are normally closed, but which open when the lobe 102 contacts the first limit switch 106. When pole 1 of the first limit switch 106 is opened, continuity is cut between the rechargeable battery 52 and the motor/generator 68, and motor/generator 68 stops moving the fire door 10 in the opening direction, even if the operator continues to press the first switch 44. Therefore, pole 1 of the first limit switch 106 prevents overdriving the door in the opening direction.

Pole 2 of the first limit switch 106 is normally closed. When the operator is pressing the first switch 44, the pole 2 of the first limit switch 106 provides continuity between the rechargeable battery 52 and the solenoid 126. Therefore, as the fire door 10 is being opened, the brake system 73 is, of course, released.

Once the fire door 10 reaches the open position, pole 2 of the first limit switch 106 opens. Opening the pole 2 of the first limit switch 106 results in discontinuity between the rechargeable battery 52 and the solenoid 126. When power is removed from the solenoid 126, the brake system 73 is again engaged. Hence, the brake system 73 is engaged at the same time that power is cut to the motor/generator 68 used to move the fire door 10 to its open position, so that the fire door 10 will not fall back to its closed position.

The DC manner of operation, utilizing a portable battery 52, is particularly advantageous. As mentioned in the background art section above, wiring carrying AC power is required to in order to control and open a conventional fire door. This AC wiring is expensive to provide and install, and on long runs can even exceed the cost of the fire door. Also, the background art suffers drawbacks in that AC power may be lost during a fire, and in that emergency personnel will need to carry and apply remotely powered tools or equipment to open a closed fire door. This hindrance to emergency personnel can be tragic in preventing the loss of life and/or property.

V. Fixed Rechargeable Battery

Figure 9:
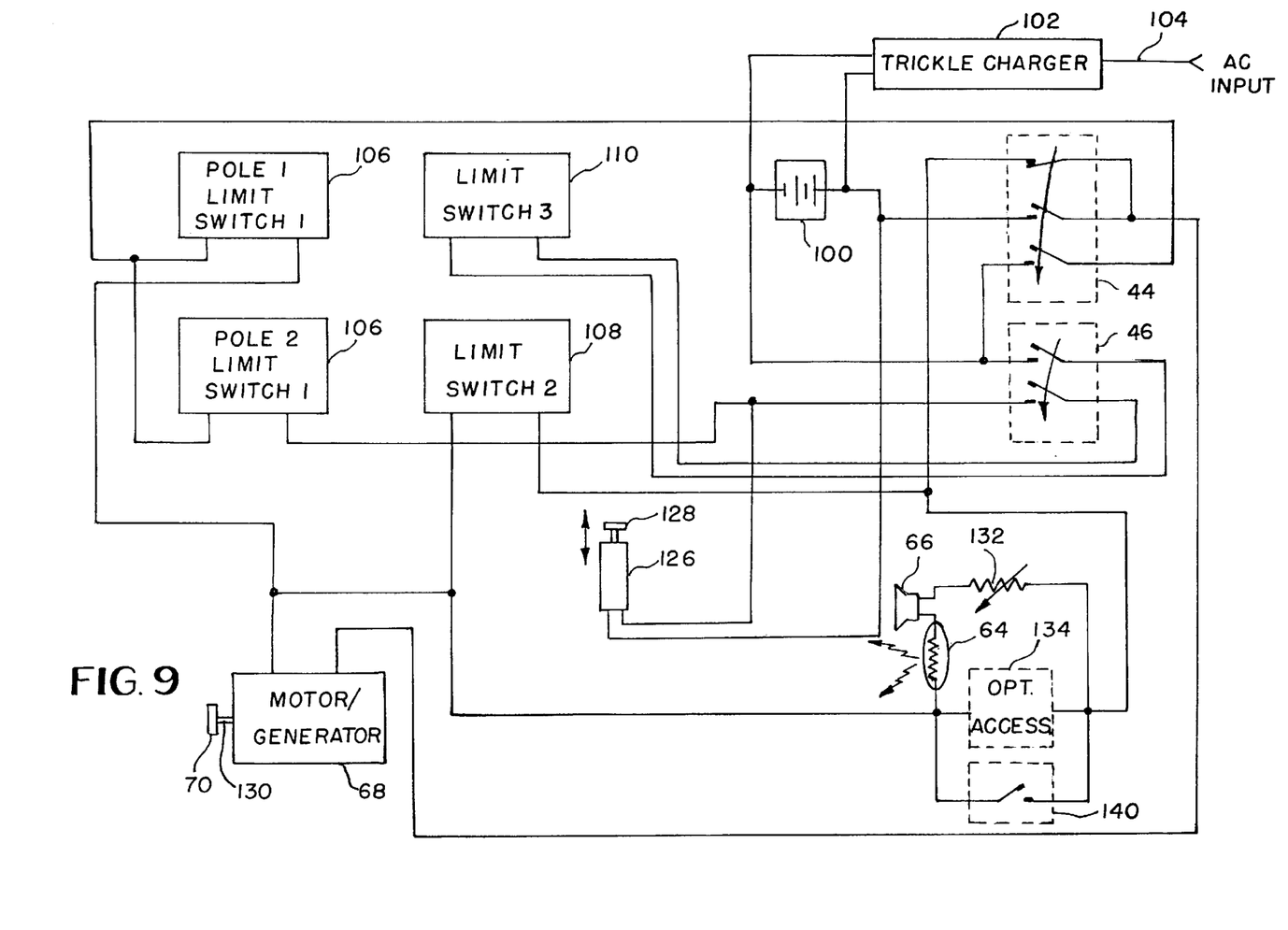
FIG. 9 is an electrical schematic of an alternative control system for the fire door.

FIG. 9 illustrates an alternative embodiment of the invention. In the alternative embodiment of FIG. 9, a rechargeable DC battery 100 is not portable, but rather fixed in or near the mechanical drive box 24. Also, in this embodiment, the first and second control panels 42, 54 do not include the first and third electrical terminals 48, 60. All the functional capabilities of the fire door 10, as discussed above, still apply. By the arrangement of FIG. 9, service personnel need not carry a portable rechargeable battery 52 in order to control or operate the fire door 10.

A trickle charger 102 is also provided in or near the mechanical drive box 24. The trickle charger 102 provides a small, slow DC charge to the rechargeable DC battery 100. The trickle charger 102 would be supplied power by high gauge (low amperage) AC wiring 104. In other words, there would be no need to run expense low gauge (high amperage) AC wiring to the fire doors 10, since the AC wiring 104 does not supply the actual power used to operate an AC motor to lift the fire door 10. The AC wiring 104 simply provides a low amperage current, necessary to power the trickle charger 102. The rechargeable DC battery 100 provides the power used to operate the DC motor to lift the fire door 10. Where possible, the trickle charger 102 could even be solar powered.

VI. Modifications

The present invention has been discussed above, and illustrated in the Figures, by way of specific examples. The present invention can be modified in many different ways, after understanding the broad teaching of the disclosure.

For example, the fire door illustrated in the figures has been an overhead type door, having interconnected slats, which are rolled up when stored. And, in the illustrated fire door, gravity provides the force tending to draw the fire door closed across the throughway.

It would be possible to have a solid fire door, or even a fire door with interconnected slats, which are not rolled up when stored (such as a common garage door which has slats, which are not rolled up when the garage door is stored overhead). Further, the fire door could be stored in its open position beneath a floor or countertop. Or, the fire door 10 could be stored in its open position in or beside a wall, lateral of the throughway to be closed. Such doors are known in the background art, and typically utilized a counterbalance weight or spring system to create the force tending to draw the fire door closed across the throughway. Moreover, the present invention, as claimed, is intended to encompass the control and operation of doors other than doors specifically designed to stop or slow the spread of fire or smoke.

FIGS. 3–5 illustrated a specific transmission. However, the present invention could be practiced with many variations in the transmission or with a different transmission. For example, more or less speed reduction could occur in the transmission. The teeth of the gears could be in direct contact, so as to eliminate the use of chains in the transmission. Alternatively, the gears and chains may be replaced by pulleys and belts.

The door position monitoring system need not be associated with the third shaft 94. Any shaft of the transmission may be utilized. Alternatively, an encoder may be used to precisely measure the rotations of the motor/generator and hence the position of the fire door.

FIG. 6 illustrated a specific braking system 73. The present invention is, of course, adaptable to many different braking systems. For example, the lever 114 need not rotate to be activated. It is envisioned that the lever 114 could be reciprocated to engage/disengage the braking system. Moreover, the entire braking system could be replaced with a completely different type of braking system. For example, a locking paw and rack could be used to arrest movement of the fire door 10. The first and/or second springs 118, 120 could be replace by elastic straps, leaf springs, or other known biasing devices.

The electrical schematic of FIG. 7 is particularly susceptible to modification, all within the spirit and scope of the present invention, as claimed. There are many ways to interconnect various electrical elements to achieve the functions of the fire door control system of the present invention. For example, a microprocessor may be employed. Relays or timers may be used in conjunction with the first and second switches, 44, 46, so that the operator need not continue to press a switch until an operation is completed.

The limit switches may be replaced by a potentiometer or an optically encoded shaft. Alternatively, the second limit switch 108, which activates the creep mode, may be replace by several limit switches associated with different resistive circuits. In so doing, the regenerative braking applied to the fire door may be adjusted depending upon the progress of the fire door as it closes. For example, by applying less and less resistance in the feed-back loop, as the door closes, more and more braking is applied, so that the dynamics of the door can be accommodated, and the door will close at a substantially uniform speed.

The Figures have illustrated the motor/generator 68 as residing in a common housing and sharing a common rotor 130. It is within the purview of the present invention that the motor could be provided separately from the generator. In such an instance, the motor and generator could supply and receive power, respectively, from a common shaft of the transmission, or could be connected to the transmission by different shafts.

The Figures have illustrated a generic rechargeable battery 52. It is envisioned that the second terminals 50 of the rechargeable battery 52 will have specific physical characteristics adapted to particularly fit into the first terminal 48 of the first control panel 42. For example, the physical characteristics of the rechargeable battery 52 may be in accordance with a portable power tool's rechargeable battery, such as a drill's battery. Such rechargeable DC batteries are commonly owned and carried by service personnel.

The operation of the present invention has been described in conjunction with the first control panel 44. Of course, operation in a like manner could also be had using the second control panel 54. Further, it would be possible to have only a single control panel located on one or the other side of the wall, if desired.

As discussed above, it will be noted that the invention may be varied in many ways. Such variations are not to be regarded as a departure from the spirit and scope of the invention, and all such modifications as would be obvious to one skilled in the art, are intended to be included within the scope of the following claims.

What is claimed:

1. A device comprising:
    a brake actuator for releasing a brake upon movement of the brake actuator;
    an expandable linkage having a normal length and having an elongate length when an external force is applied thereto, said linkage having a first end connected to said brake actuator and a second end for connection to a fire condition sensitive device which releases said second end upon a fire indicative condition, wherein said brake actuator will move to release said brake when said fire condition sensitive device releases said second end of said linkage and will move to release said brake when said linkage has its elongate length, but will not move to release said brake when said linkage has its standard length and said second end of said linkage is not released by said fire condition sensitive device; and a solenoid including a movable plunger, said movable plunger for applying the external force to said linkage to cause said linkage to assume its elongate length and thereby cause movement of said brake actuator for releasing the brake.

2. The device according to claim 1, wherein said linkage includes a fixed length of chain and a spring serially connected with said fire condition sensitive device.

3. The device according to claim 1, wherein said solenoid is DC powered.

4. The device according to claim 1, further comprising:
a handle, said handle allowing a person to apply the external force to said linkage, independent of said solenoid, to cause said linkage to assume its elongate length and thereby cause movement of said brake actuator for releasing the brake.

5. The device according to claim 1, wherein said fire condition sensitive device includes a fusible link which severs upon excessive heat.

6. The device according to claim 5, wherein said fire condition sensitive device further includes a detachable support which releases in response to excessive smoke.

7. A device comprising:
a door having an open, first position and a closed, second position, with a force tending to move said door toward said second position;
a disengageable stop connected to said door to hold said door in said first position;
a motor connected to said door, said motor having an ability to move said door from said second position to said first position; and
a housing for enclosing said motor; and
a first power terminal located remotely from said housing and electrically connected to said motor for temporarily receiving a second power terminal of a portable power supply carried by a person.

8. The device according to claim 7, wherein the force tending to move said door toward said second position is caused by a weight of said door.

9. The device according to claim 7, wherein said disengageable stop includes a brake for holding said door in said first position and a heat or smoke sensitive device, which releases said brake to allow said door to move to said second position, in response to a presence of excessive heat or smoke.

10. The device according to claim 9, wherein said heat or smoke sensitive device includes a fusible link, which severs upon excessive heat.

11. The device according to claim 7, wherein said motor is DC powered, and wherein said first power terminal is for receiving the second power terminal of the portable power supply in a form of a DC battery.

12. The device according to claim 7, further comprising:
a spring connected to said door, said spring storing potential energy when said door is moved from said second position to said first position, and said spring transmitting a force to said door tending to move said door toward said second position.

13. The device according to claim 7, further comprising:
gearing connecting said motor to said door.

14. A device comprising:
a door having an open, first position and a closed, second position, with a force tending to move said door toward said second position;
a disengageable stop connected to said door to hold said door in said first position;
a motor connected to said door, said motor having an ability to move said door from said second position to said first position;
a housing for enclosing said motor;
a first power terminal located remotely from said housing and electrically connected to said motor; and
a portable power supply adapted to be carried by a person having a second power terminal to temporarily connect to said first power terminal.

15. The device according to claim 14, wherein said motor is DC powered and wherein said portable power supply includes a rechargeable DC battery.

16. A device comprising:
a door having an open, first position and a closed, second position, with a force tending to move said door toward said second position;
a disengageable stop connected to said door to hold said door in said first position;
a motor connected to said door, said motor having an ability to move said door from said second position to said first position; and
a generator connected to said door, wherein movement of said door from said first position to said second position causes said generator to produce power to apply a braking force to slow movement of said door from said first position to said second position and to power at least one auxiliary device.

17. The device according to claim 16, wherein said motor and said generator are incorporated into a common housing and share a common rotor.

18. The device according to claim 16, wherein said power is fed to said motor, so that said motor applies a force to said door attempting to move said door toward said first position, and thus applies the braking force to slow movement of said door from said first position to said second position.

19. The device according to claim 18, further comprising:
circuitry included in an electrical connection between said generator and said motor, said circuitry including a variable resistor for adjusting a level of said power applied to said motor, to thereby adjust a level of said braking force applied by said motor to said door.

20. The device according to claim 18, further comprising:
circuitry included in an electrical connection between said generator and said motor, said circuitry including a switch and a resistor, said circuitry allowing a first level of power to be applied to said motor when said switch is not activated and allowing a second level of power, greater than said first level of power, to be applied to said motor when said switch is activated, thereby increasing a level of braking applied by said motor.

21. The device according to claim 20, wherein said switch includes a pressure activated switch attached to a leading edge of said door.

22. The device according to claim 20, wherein said switch is activated when said switch is closed, and closing of said switch corresponds to providing a short circuit bypass to said resistor.

23. The device according to claim 20, wherein said switch is activated during at least a predetermined portion of movement of said door from said first position to said second position.

24. The device according to claim 23, herein said predetermined portion of movement of said door occurs just prior to said door reaching said second position, to thereby increase the level of braking applied by said motor as said door reaches said second position.

25. The device according to claim 24, further comprising:
   a gear connected to rotate in response to a rotation of said motor;
   a threaded shaft attached to said gear; and
   a sleeve with a lobe thereon, said sleeve engaged to said threaded shaft, wherein rotation of said gear in a first angular direction causes said sleeve to travel along said threaded shaft in a first longitudinal direction, and rotation of said gear in a second angular direction causes said sleeve to travel along said shaft in a second longitudinal direction, and wherein said switch is disposed adjacent said shaft such that said lobe activates said switch, as said sleeve travels along said shaft.

26. The device according to claim 25, wherein said switch is a first switch, and further comprising:
   a second switch disposed adjacent said shaft such that said lobe activates said second switch when said door reaches said first position, and wherein said second switch deactivates said motor.

27. The device according to claim 16, wherein said at least one auxiliary device includes an indicator to provide a visual or audible indication that said door is moving from said first position to said second position.

28. The device according to claim 16, wherein said door is stored in a roll when in said first position.

29. The device according to claim 16, wherein said disengageable stop includes a fire condition sensitive device, which disengages said disengageable stop to allow said door to move to its second position, in response to a presence of excessive heat or smoke.

30. The device according to claim 29, wherein said fire condition sensitive device includes a fusible link which severs upon excessive heat.

31. The device according to claim 30, wherein said fire condition sensitive device further includes a detachable support which releases in response to excessive smoke.

32. A device comprising:
   a door having an open, first position and a closed, second position, with a force tending to move said door toward said second position;
   a disengageable stop connected to said door to hold said door in said first position, said disengageable stop including:
   a brake actuator for releasing a brake upon movement of the brake actuator; and
   an expandable linkage having a normal length and having an elongate length when an external force is applied thereto, said linkage having a first end connected to said brake actuator and a second end for connection to a fire condition sensitive device which releases said second end upon a fire indicative condition;
   wherein said brake actuator will move to release said brake when said fire condition sensitive device releases said second end of said linkage and will move to release said brake when said linkage has its elongate length, but will not move to release said brake when said linkage has its standard length and said second end of said linkage is not released by said fire condition sensitive device;
   a generator connected to said door, wherein movement of said door from said first position to said second position causes said generator to produce power;
   a motor connected to said door, said motor having an ability to move said door from said second position to said first position;
   a first power terminal connected to said motor; and
   a portable power supply having a second power terminal to connect to said first power terminal.

33. The device according to claim 32, wherein said motor and said generator are incorporated into a common housing and share a common rotor.

34. The device according to claim 32, wherein said power is fed to said motor, so that said motor applies a force to said door attempting to move said door toward said first position, and thus applies a braking force to slow movement of said door from said first position to said second position.

35. The device according to claim 32, wherein said motor is DC powered and wherein said portable power supply includes a rechargeable DC battery.

36. The device according to claim 35, further comprising:
   a DC powered solenoid including a movable plunger, said movable plunger for applying the external force to said linkage to cause said linkage to assume its elongate length and thereby cause movement of said brake actuator for releasing the brake.

37. The device according to claim 32, wherein said door is a fire resistant door.

38. The device according to claim 32, wherein said door is a grated shutter.

39. The device according to claim 32, wherein said fire condition sensitive device includes a fusible link which severs upon excessive heat and a detachable support which releases in response to excessive smoke.

* * * * *